US012668175B2

(12) United States Patent

Adler et al.

(10) Patent No.: US 12,668,175 B2

(45) Date of Patent: Jun. 30, 2026

(54) MOTOR VEHICLE HAVING A DECORATIVE PART OR TRIM PART IN THE EXTERNAL REGION

(71) Applicant: Bayerische Motoren Werke Aktiengesellschaft, Munich (DE)

(72) Inventors: Stefan Adler, Munich (DE); Sabrina Duessel, Starnberg (DE); Arne Koehler, Pliening (DE); Haci Korkusuz Janket, Putzbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 976 days.

(21) Appl. No.: 17/593,719

(22) PCT Filed: Mar. 20, 2020

(86) PCT No.: PCT/EP2020/057745

§ 371 (c)(1),
(2) Date: Sep. 23, 2021

(87) PCT Pub. No.: WO2020/212072

PCT Pub. Date: Oct. 22, 2020

(65) Prior Publication Data

US 2022/0161717 A1      May 26, 2022

(30) Foreign Application Priority Data

Apr. 18, 2019     (DE) ..................... 10 2019 110 238.3

(51) Int. Cl.
| | |
|---|---|
| *B60Q 1/28* | (2006.01) |
| *B60R 19/52* | (2006.01) |

(Continued)

(52) U.S. Cl.
CPC ................ *B60Q 1/28* (2013.01); *B60R 19/52* (2013.01); *F21S 43/15* (2018.01); *F21S 43/26* (2018.01); *B60R 2019/525* (2013.01)

(58) Field of Classification Search
CPC . B60Q 1/247; B60Q 1/26; B60Q 1/28; B60Q 3/14; B60Q 3/78; F21S 43/15; F21S 43/20
See application file for complete search history.

(56) References Cited

U.S. PATENT DOCUMENTS

| | | | |
|---|---|---|---|
| 2012/0280528 A1 | 11/2012 | Dellock et al. | |
| 2015/0022994 A1* | 1/2015 | Bingle ................... | G01D 13/20 362/23.01 |

(Continued)

FOREIGN PATENT DOCUMENTS

| | | |
|---|---|---|
| CN | 102774314 A | 11/2012 |
| CN | 105764751 A | 7/2016 |

(Continued)

OTHER PUBLICATIONS

English translation of Chinese-language Office Action issued in Chinese Application No. 202080028135.2 dated May 31, 2023 (8 pages).

(Continued)

*Primary Examiner* — William J Carter

(74) *Attorney, Agent, or Firm* — Crowell & Moring LLP

(57) ABSTRACT

In a motor vehicle, an elongated contour of a decorative part or trim part which is visible from outside the vehicle is illuminated in the external region. Such a contour may be, for example, a bead of a decorative part or trim part which, for example, is particularly striking or forms part of a vehicle manufacturer's typical design language. In darkness, the contour, which would otherwise no longer be discernible, is then readily visible due to the illumination. This (Continued)

increases the significance of the visual appearance of the vehicle in darkness.

9 Claims, 1 Drawing Sheet

(51) Int. Cl.
*F21S 43/15* (2018.01)
*F21S 43/20* (2018.01)

(56) References Cited

U.S. PATENT DOCUMENTS

| | | |
|---|---|---|
| 2015/0298604 A1 | 10/2015 | Pfeil et al. |
| 2016/0236613 A1 | 8/2016 | Trier |
| 2018/0001816 A1 | 1/2018 | Dellock et al. |
| 2018/0272927 A1* | 9/2018 | Moore ................. B60Q 1/2661 |

FOREIGN PATENT DOCUMENTS

| | | |
|---|---|---|
| DE | 10 2012 003 200 A1 | 8/2013 |
| DE | 10 2012 009 291 A1 | 11/2013 |
| DE | 20 2017 103 775 U1 | 8/2017 |
| EP | 2 628 638 A2 | 8/2013 |
| GB | 2517736 A | 3/2015 |
| JP | 2008-105556 A | 5/2008 |
| WO | WO 2013/135387 A1 | 9/2013 |

OTHER PUBLICATIONS

International Search Report (PCT/ISA/210) issued in PCT Application No. PCT/EP2020/057745 dated Jun. 8, 2020 with English translation (five (5) pages).
German-language Written Opinion (PCT/ISA/237) issued in PCT Application No. PCT/EP2020/057745 dated Jun. 8, 2020 (seven (7) pages).
German-language Office Action issued in German Application No. 10 2019 110 238.3 dated Mar. 18, 2020 (six (6) pages).

* cited by examiner

MOTOR VEHICLE HAVING A DECORATIVE PART OR TRIM PART IN THE EXTERNAL REGION

BACKGROUND AND SUMMARY OF THE INVENTION

The invention relates to a motor vehicle having a decorative part or trim part in the exterior region.

From DE 20 2017 103 775 U1, a motor vehicle having an illuminated radiator grille is known.

It is an object of the invention to create a motor vehicle having a decorative part or trim part in the exterior region which has a special visual appearance.

This object is achieved with a motor vehicle having a decorative part or trim part in the exterior region with the features of the independent claim. Further claims additionally specify a method for manufacturing a decorative part or trim part according to the invention.

According to the invention, in a motor vehicle, an elongated contour of a decorative part or trim part which is visible from outside the vehicle is illuminated in the exterior region. Such a contour can be, for example, a bead of a decorative part or trim part which, for example, is particularly distinctive or is part of the typical design language of a vehicle manufacturer. The contour, which would otherwise no longer be discernible in the dark, is then clearly visible due to the illumination. This increases the significance of the visual appearance of the vehicle in the dark.

According to an advantageous configuration, the contour is the outer contour of the decorative part or trim part visible from outside the vehicle. For example, the decorative part or trim part can be a radiator grille or a decorative grille in a radiator grille. Depending on the vehicle manufacturer, the radiator grille often has a distinctive shape. In the case of BMW, for example, the radiator grille has the brand-specific shape of a double kidney. If this distinctive shape is illuminated, it is now possible, even in the dark, to tell immediately from the illuminated outer contour which manufacturer the vehicle is from. Conveniently, the entire outer contour of the decorative part or trim part, which is visible from outside the vehicle, is illuminated circumferentially. This is a unique selling point since no known vehicle manufacturer currently has such contour illumination as standard on a vehicle available for purchase.

Conveniently, a recess in the decorative part or trim part which is visible from outside the vehicle is illuminated circumferentially. For example, the radiator grille can include a chrome-plated or painted frame having a large recess in which decorative bars and/or a decorative grille are/is inserted. In this case, the frame of the radiator grille, which, for example, is chrome-plated or painted, can be illuminated circumferentially around the recess.

Preferably, the lighting is integrated into the decorative part or trim part. In this way, the lighting is not a separate component that is visible as such, but rather forms an integral part of the decorative part or trim part. This improves the visual appearance compared with separately designed lighting and reduces the assembly effort required in the manufacture of the motor vehicle since the decorative part or trim part can be delivered by a supplier together with the integrated lighting as a finished assembly.

Ideally, on the outside visible from outside the vehicle, the decorative part or trim part has an at least substantially opaque layer of chrome or paint in the region of the elongated contour. Usually, in today's motor vehicles, the components or component portions of a decorative part or trim part that are intended to have a particularly high-quality appeal are chrome-plated or painted. According to the invention, the corresponding contours have a particularly appealing appearance by day due to the chrome plating or painting and by night due to the illumination. This ensures that the contours are always clearly visible under all lighting conditions.

Preferably, the chrome or paint layer is applied onto an at least partially translucent plastic material into which light can be introduced for illuminating the contour. The chrome or paint layer has at least one interruption and/or recess along the contour through which light introduced into the at least partially translucent plastic material can emerge to the outside. This is a simple and therefore also inexpensive way of manufacturing an illuminated contour. For example, the contour can have multiple narrow interruptions in the chrome or paint layer one behind the other and/or next to each other in the longitudinal direction. These narrow interruptions can have, for example, the shape of straight strips. However, the interruptions can also be arranged in an arc-shaped manner or consist of a plurality of straight strips which are at an angle to one another. Alternatively and/or complementarily, numerous interruptions can be arranged in close proximity to each other. For example, the light outlet can consist of one or more rows of circular or elliptical recesses arranged one behind the other in the longitudinal extent of the contour.

According to a further development, such a decorative part or trim part of a motor vehicle can be manufactured in at least the following method steps: First, the decorative part or trim part is painted with a primer in the region of the contour. Then, the primer is removed in the region of the at least one interruption and/or recess. Subsequently, the decorative part or trim part is chrome-plated or painted in the region of the contour. In doing so, the paint or chrome remains adhered only to the primer.

Alternatively, according to a further development, a primer or a second component can first be applied onto the decorative part or trim part, wherein the region for the at least one interruption and/or recess for possible light emission remains free. Subsequently, the decorative part or trim part is chrome-plated or painted in the region of the contour. In doing so, the paint or chrome remains adhered only to the primer or the second component.

In both manufacturing methods, one or more layers of an at least partially translucent paint can be applied onto the contour with the paint or chrome layer to protect the finished component.

Further advantageous configurations are the subject matter of the dependent claims.

The drawing shows an exemplary embodiment of the invention, based on which the invention is described in more detail below.

DETAILED DESCRIPTION OF THE DRAWINGS

Figure 1:
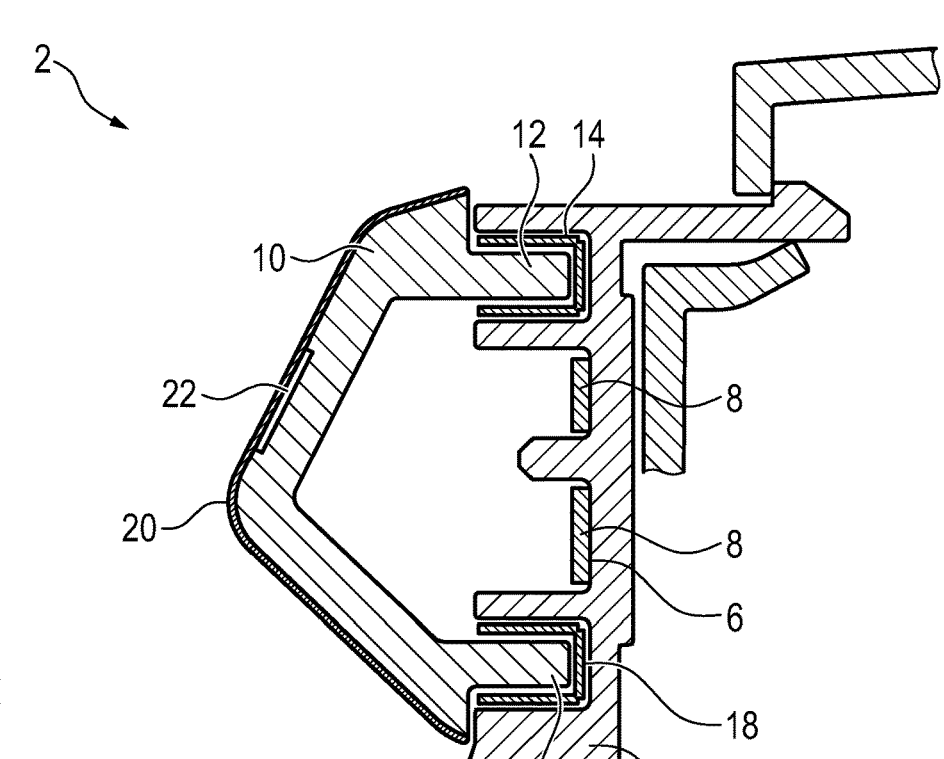
FIG. 1 is a detailed section through an edge region of a radiator grille of a motor vehicle.

FIG. 1 shows a section through a frame 2 surrounding a radiator grille of a motor vehicle, which can be seen from the front on the outside of the vehicle. The frame 2 surrounds the actual radiator grille which has a plurality of vertical struts arranged side by side, each of which extends over the entire height of the frame 2. The frame 2 surrounds the radiator grille circumferentially and has a typical vehicle-specific contour.

As can clearly be seen in FIG. 1, the frame 2 has a base support 4 made of a thermoplastic plastic material. The base support 4 has an end face 6 pointing forward in the longitudinal direction x of the vehicle. On this end face 6, a plurality of light-emitting diodes 8 are arranged circumferentially around the entire frame 2. The light-emitting diodes 8 are protected from dirt and damage by a circumferential cover 10 made of a transparent polycarbonate or a translucent acrylic-butadiene-styrene copolymer (ABS). For this purpose, the cover 10 has an upper web 12 which projects backwards in the longitudinal direction x of the vehicle and which is adhesively bonded in a watertight manner in a U-shaped receptacle 14 of the base carrier 4 above the light-emitting diodes 8, and a lower web 16 which projects backwards in the longitudinal direction x of the vehicle and which is adhesively bonded in a watertight manner in a U-shaped receptacle 18 of the base carrier 4 below the light-emitting diodes 8. Thus, the base support with the receptacles 14, 18 and the cover 10 with the webs 12, 16 form a housing which protectively surrounds the light-emitting diodes 8.

Of the entire frame 2, mainly the cover 10 is visible from outside the vehicle.

To increase the significance of the visual appearance of the frame 2, the cover 10 is painted in the color of the vehicle body or in a suitable contrasting color. Since most paints do not adhere directly to the polycarbonate of the cover 10, a so-called primer, which serves as an adhesion promoter and is opaque, is provided between the paint layer 20 and the cover 10. In this way, the frame 2 has a high-quality appearance when it is light. However, light from the light-emitting diodes 8 can no longer penetrate through the primer to the outside to enable the desired illumination of the frame 2 in the dark.

Therefore, after priming the cover 10, the primer is removed again locally along the cover 10 with a LASER before the cover 10 is painted. For example, the LASER can make numerous small circular recesses 22 in the primer circumferentially around the entire cover 10 so that there is no more primer present in these recesses 22. When the cover 10 is now painted, the paint adheres only to the primed areas. The recesses 22 without primer remain free of paint. The numerous recesses 22 are dimensioned to be so small that the painted regions of the cover 10 dominate the visual appearance in daylight. In the dark, on the other hand, light from the light-emitting diodes 8 can emerge through the recesses and thus illuminate the cover 10. To protect the paint layer 20, the entire painted cover 10 can still be additionally coated with a transparent topcoat.

In today's motor vehicles, the radiator grille can hardly be seen in the dark. In the solution according to the invention, on the other hand, the outer contour of the frame 2 of the radiator grille is illuminated so that the contour is very clearly visible. This creates a very high-quality appearance in the dark without the illumination impairing the visual appearance.

Instead of the paint layer 20, a chrome layer can be applied onto the cover 10 in the same way. Applying a chrome layer also first requires a primer to which the chrome can adhere. Accordingly, in this variant, which is not shown, recesses can also be made in the primer, for example using a LASER, so that no chrome can adhere in these recessed regions.

In the previously described first embodiment, the cover 10 is primed and painted or chrome-plated on the outside. As an alternative to this first embodiment, instead of applying a paint layer on the outside of the cover 10, a paint layer with recesses can be applied in the same way on the side of the cover 10 facing the light-emitting diodes 8. In this second embodiment, a vapor-deposited PVD coating can then be applied onto the outside of the cover, which, if necessary, can be protected from damage by a clear lacquer. Such a PVD coating looks similar to a chrome layer and, in daylight, leads to reflections that are so strong that it is almost impossible to see what is under the PVD layer. However, the PVD layer is so thin that, in the dark, light from the light emitting diodes 8 can pass through the recesses and through the PVD layer. In this case, the PVD layer only partially attenuates the light.

According to a third embodiment, only the outside of the cover 10 is provided with a PVD layer in which recesses are then formed using a LASER. Subsequently, a second PVD layer is applied, which is protected by a final clear lacquer. In this variant, light can pass through the recesses in the lower PVD layer and through the second PVD layer. In this case, the second PVD layer slightly attenuates the emitted light. In the remaining regions, very little light emerges through the two PVD layers.

In all variants, a diffuser can additionally be arranged between the light-emitting diodes 8 and the cover 10 to deflect and evenly distribute the light emitted by the light-emitting diodes 8. Alternatively, the cover 10 can also serve as a diffuser.

Instead of the light-emitting diodes 8, one or more optical fibers can also be used. In this case, no diffuser is required.

All the embodiments described heretofore are based on the basic idea of first applying a layer onto the cover on the inside or outside, which at least attenuates the passage of light. Recesses are then made locally in this layer, either mechanically or by LASER, through which the light can pass unhindered. These recesses can be of any shape but can in particular be configured to be round or strip-shaped.

Figure 2:
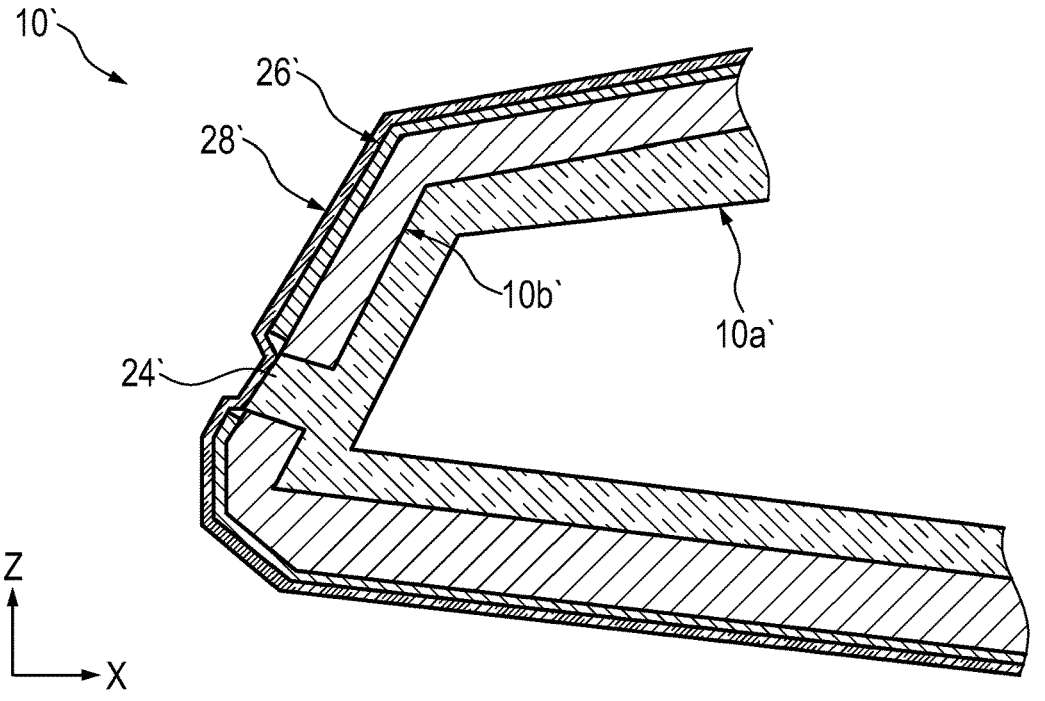
FIG. 2 is a detailed section of an alternatively designed edge region of the radiator grille of a motor vehicle.

FIG. 2 shows a concept that differs from the previously described variants. In this alternative, a layer, such as a primer or a PVD layer, into which recesses are then made with a LASER, is not first applied over the entire surface, but the chrome or paint layer is applied immediately with recesses. This alternative method is explained with reference to the cover 10' shown in FIG. 2, which has a slightly different geometrical design. The cover 10' is a 2-component plastic component, thus, it consists of a first component 10a' onto which a second component 10b' is applied. In this case, the first component 10a' made of translucent polycarbonate forms the inner part of the cover 10' facing the light-emitting diodes (or fiber optics). At the front, viewed in the longitudinal direction x of the vehicle, the first component 10a' additionally has a narrow forward-projecting web 24'.

The second component 10b' made of opaque ABS is applied onto the outside of the first component 10a'. The second component completely surrounds the first component 10a' and only the web 24' is flush with the second component 10b' on the outside such that the end face of the web 24' is not covered by the adjacent second component 10b'.

A primer is now applied onto the outside of this cover 10'. However, the primer adheres only to the second component 10b' and not to the end face of the web 24' made from the first component 10a'. The end face of the web 24' therefore remains free and no primer adheres thereon. During subsequent painting or chrome-plating, the paint or chrome layer 26' adheres only to the primer. In this way, the end face of the web 24' thus remains free and is covered neither with the primer nor with the paint or chrome layer 26'. To protect the cover 10' manufactured in this manner, the entire cover 10' is finally coated on the entire outside with a transparent clear lacquer layer 28'.

The web 24' is dimensioned so narrowly that, during the day, it is barely visible on the otherwise painted or chrome-plated cover 10'. In the dark, on the other hand, light can emerge outwardly from the cover 10' through this web 24' and thus discreetly illuminates the contour of the decorative part or trim part as a band of light, so that the contour is clearly visible even in the dark.

Because a 2-component plastic component is used in this alternative manufacturing method, it is not necessary to remove a primer, paint, or chrome layer at specific points after it has been applied. Rather, this method step can be omitted since the desired light-emitting surfaces remain free from the beginning. Thus, the first component 10a' serves as a stop layer for the paint or chrome layer.

What is claimed is:

1. A motor vehicle, comprising:
a decorative part or trim part in an exterior region of the motor vehicle, wherein
an elongated contour of the decorative part or trim part, which is visible from outside the vehicle, is illuminated, wherein
the decorative part or trim part has an at least substantially opaque chrome or paint layer in a region of the elongated contour on the outside visible from outside the vehicle,
the chrome or paint layer is applied onto an at least partially translucent plastic material into which light is introduced for illuminating the contour, and
the chrome or paint layer has at least one interruption and/or recess along the contour through which light introduced into the at least partially translucent plastic material emerges to the outside.

2. The motor vehicle according to claim 1, wherein
an outer contour of the decorative part or trim part, which is visible from outside the vehicle, is illuminated.

3. The motor vehicle according to claim 1, wherein
a recess in the decorative part or trim part, which is visible from outside the vehicle, is circumferentially illuminated.

4. The motor vehicle according to claim 1, wherein
lighting is integrated into the decorative part or trim part.

5. The motor vehicle according to claim 1, wherein
the decorative part or trim part is a radiator grille.

6. The motor vehicle according to claim 1, wherein
the at least partially translucent plastic material is adhesively bonded to the remaining decorative part or trim part in a waterproof manner.

7. The motor vehicle according to claim 1, wherein the illuminated elongated contour defines a shape that is associated with a vehicle brand.

8. A method for manufacturing a decorative part or trim part of a motor vehicle, the decorative part or trim part being for an exterior region of the vehicle, the method comprising the steps of:
a. applying a primer onto the decorative part or trim part, wherein the decorative part or trim part has an elongated contour, which is visible from outside the vehicle, that is illuminated with lighting integrated into the decorative part or trim part;
b. removing the primer in a region of at least one interruption and/or recess for light emission; and
c. chrome-plating or painting the decorative part or trim part in the region of the contour, wherein the paint or chrome remains adhered only to the primer.

9. A method for manufacturing a decorative part or trim part of a motor vehicle, the decorative part or trim part being for an exterior region of the vehicle, the method comprising the steps of:
a. applying a primer or a second component onto the decorative part or trim part, wherein the decorative part or trim part has an elongated contour, which is visible from outside the vehicle, that is illuminated with lighting integrated into the decorative part or trim part, and a region of at least one interruption and/or recess remains free for light emission; and
b. chrome-plating or painting the decorative part or trim part in the region of the contour, wherein the paint or chrome remains adhered only to the primer or second component.

* * * * *